United States Patent [19]

Oliver

[11] 4,156,516
[45] May 29, 1979

[54] APPARATUS FOR SHAPING MOLDABLE MATERIALS

[76] Inventor: Jerry L. Oliver, 8377 Whitegate Rd., Morrow, Ohio 45152

[21] Appl. No.: 815,816

[22] Filed: Jul. 15, 1977

[51] Int. Cl.² ............................................. B29C 11/00
[52] U.S. Cl. .................................. 249/53 R; 249/139; 249/155; 249/159; 425/89
[58] Field of Search ...................... 249/53 R, 155, 139, 249/160, 134, 156, 159, 115; 425/89, DIG. 44

[56] References Cited

U.S. PATENT DOCUMENTS

| | | | |
|---|---|---|---|
| 1,478,801 | 12/1923 | Slye | 249/159 |
| 1,549,884 | 8/1925 | Linhart | 249/53 X |
| 2,197,212 | 4/1940 | Hagemeyer | 249/139 X |
| 2,827,849 | 3/1958 | Paris | 249/159 |
| 2,981,997 | 5/1961 | Painter | 249/159 |
| 3,492,384 | 1/1970 | Matthews et al. | 425/89 X |
| 3,530,540 | 9/1970 | Mueller | 249/155 X |
| 3,700,373 | 10/1972 | Fowler | 425/89 X |

FOREIGN PATENT DOCUMENTS

| | | | |
|---|---|---|---|
| 2260333 | 6/1924 | Fed. Rep. of Germany | 249/160 |
| 1423898 | 11/1965 | France | 249/160 |
| 894113 | 4/1962 | United Kingdom | 249/155 |

*Primary Examiner*—William R. Briggs
*Attorney, Agent, or Firm*—Melville, Strasser, Foster & Hoffman

[57] ABSTRACT

A reusable mold for shaping moldable material comprising a flexible freestanding wall capable of being formed in any desired shape to form the contour of the material to be molded, and a method for assembling and using the mold. The mold may include several interconnecting sections and means to hold the mold tightly against a base section to prevent leakage of the moldable material. Preprinted designs may be provided for shaping the mold to follow a desired design outline.

21 Claims, 17 Drawing Figures

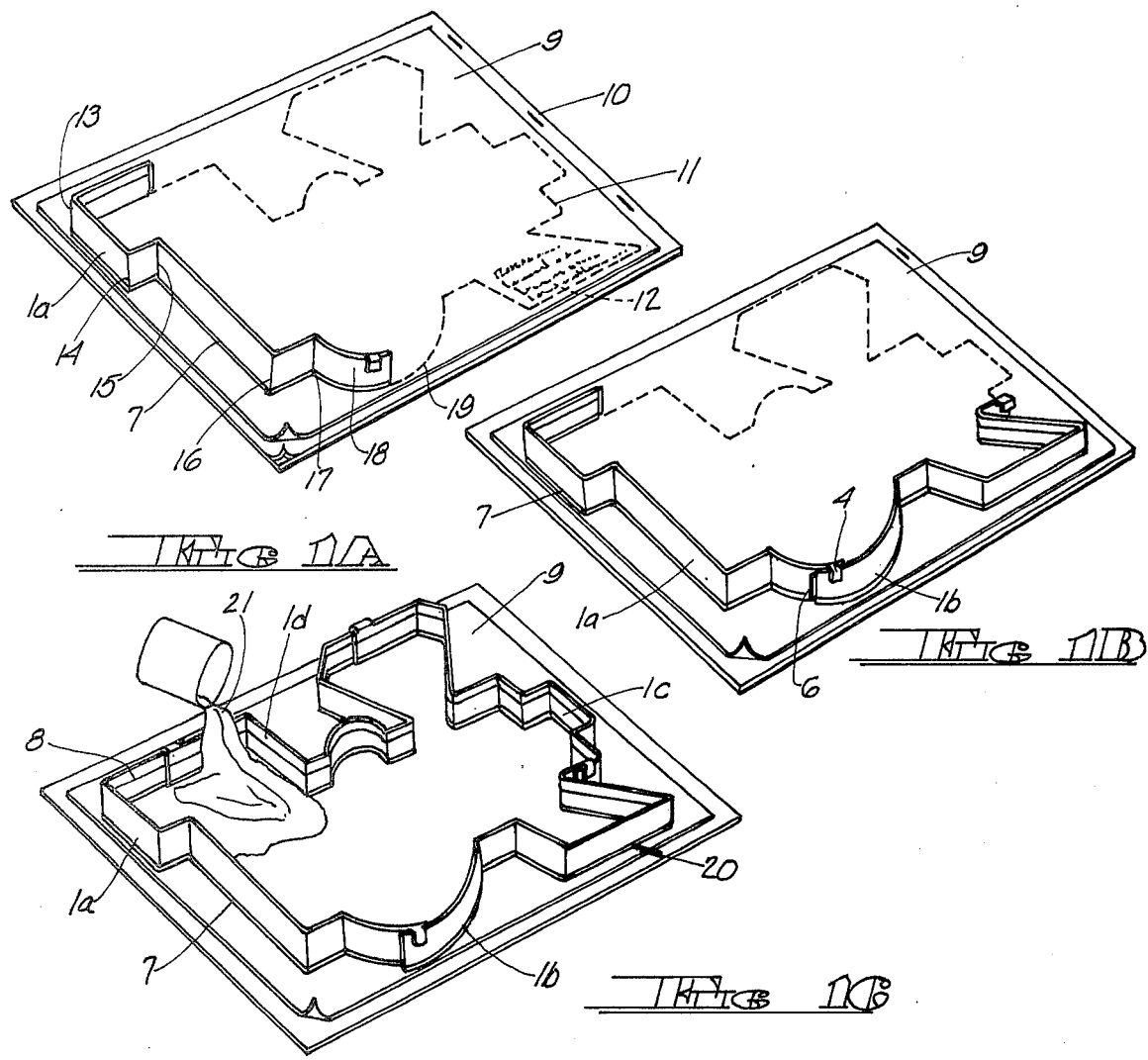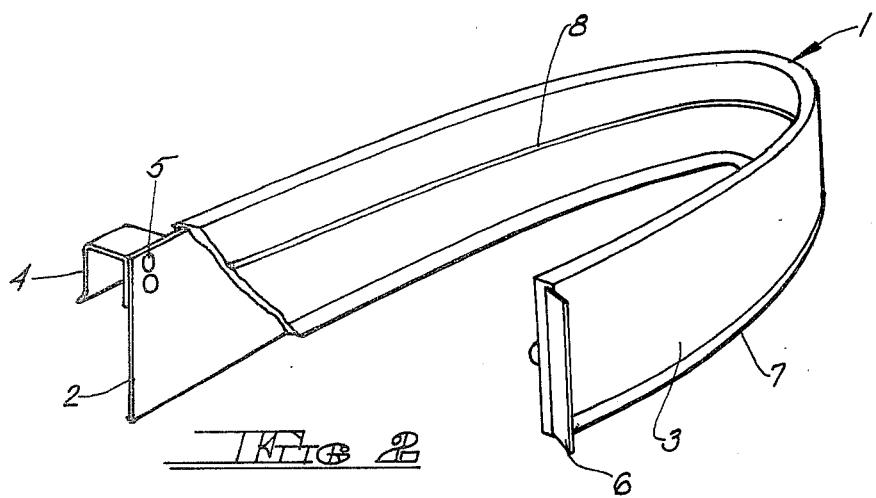

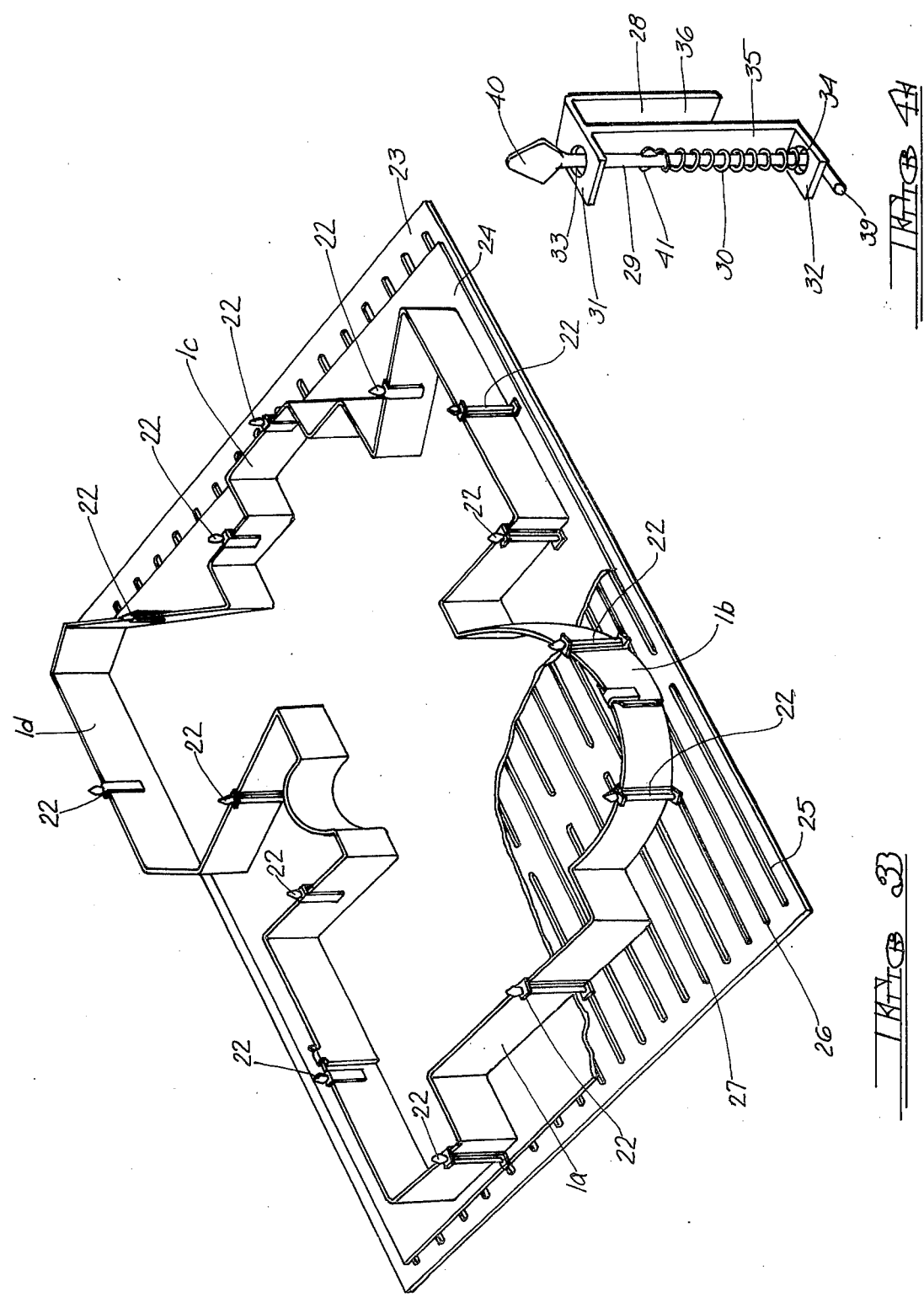

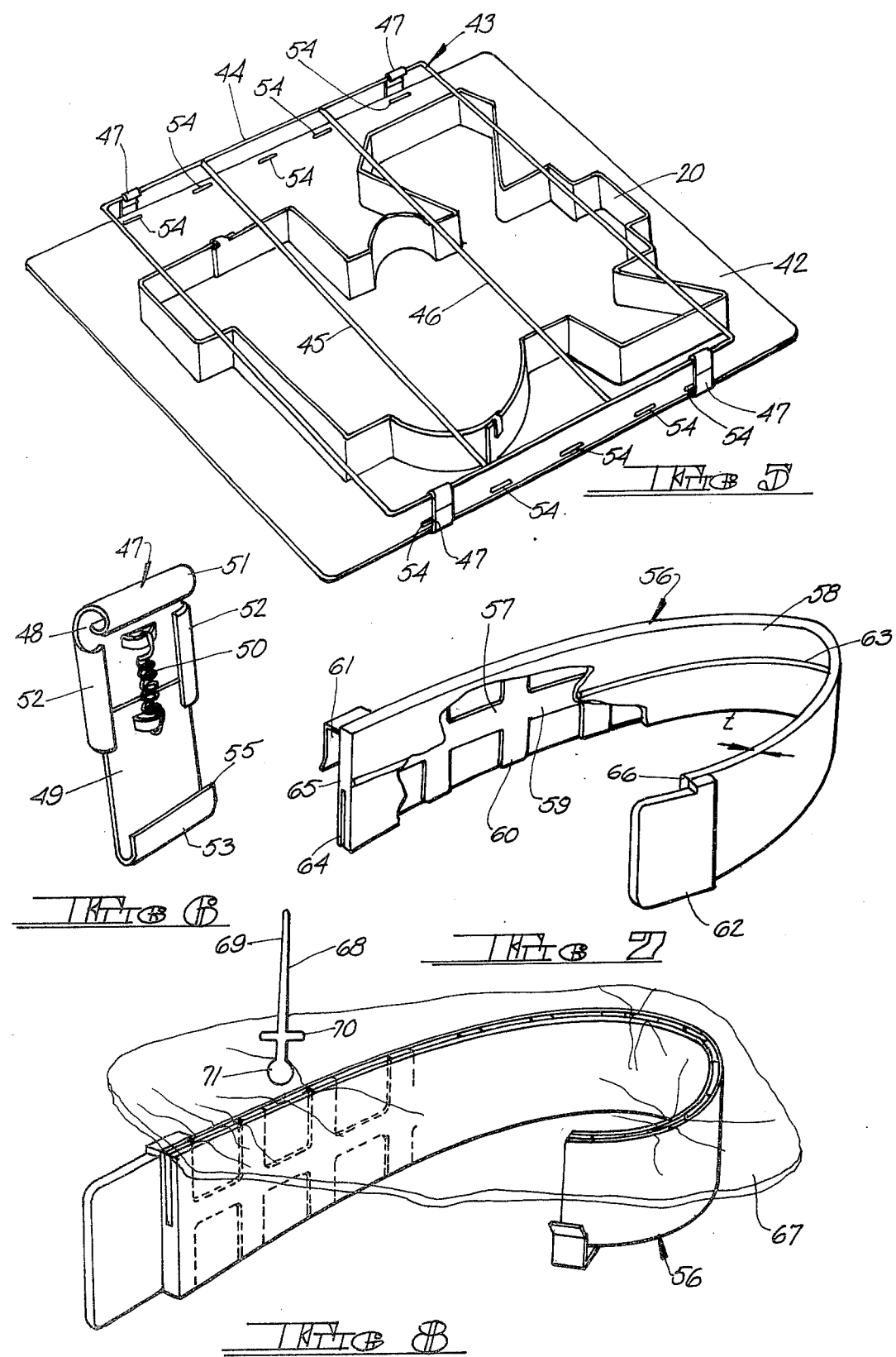

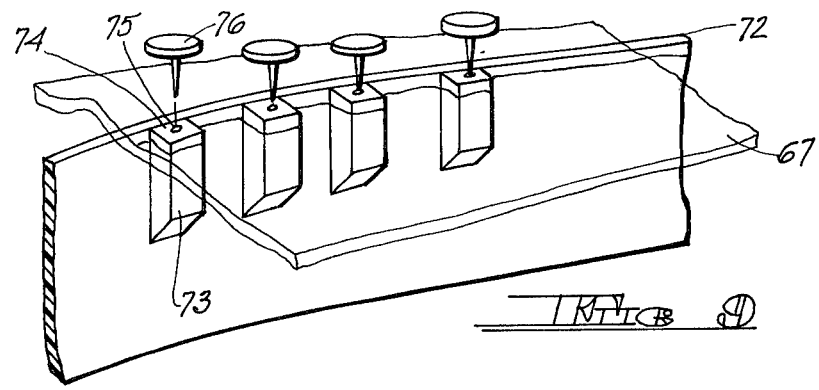
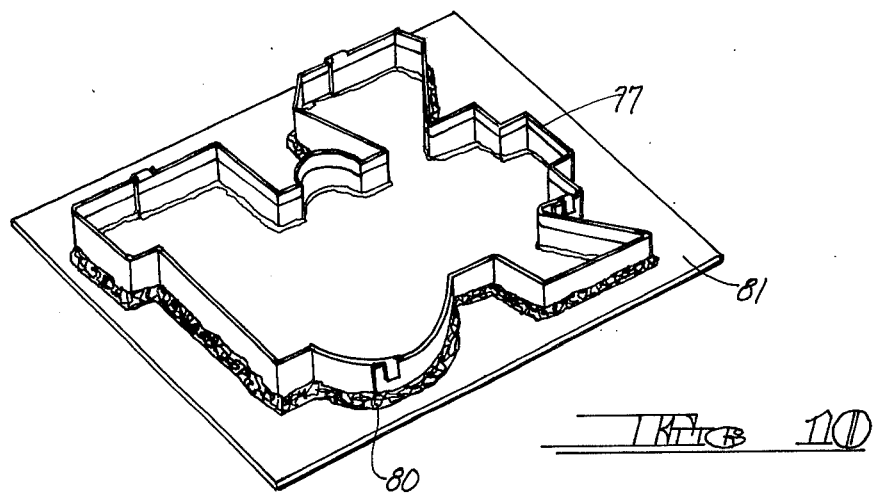
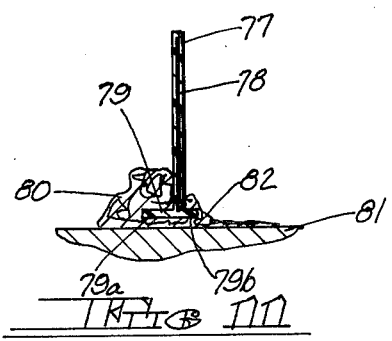
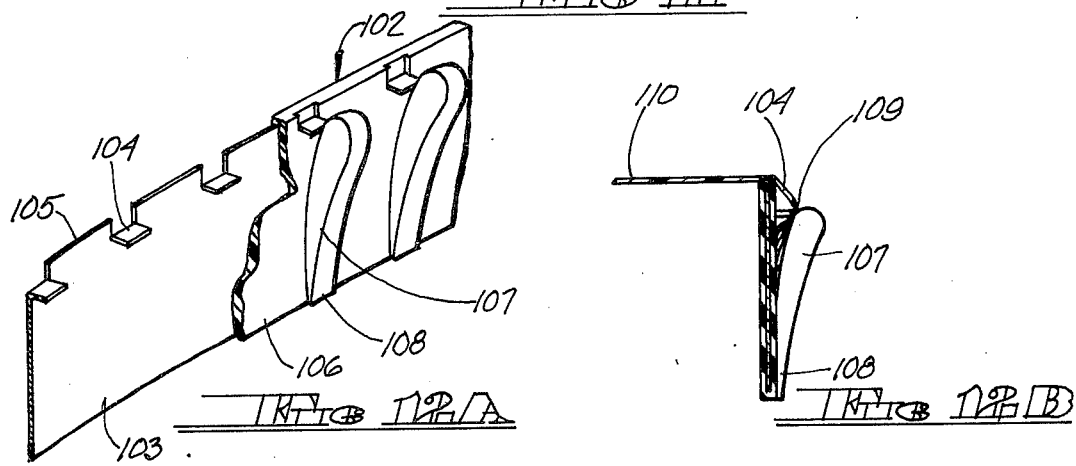

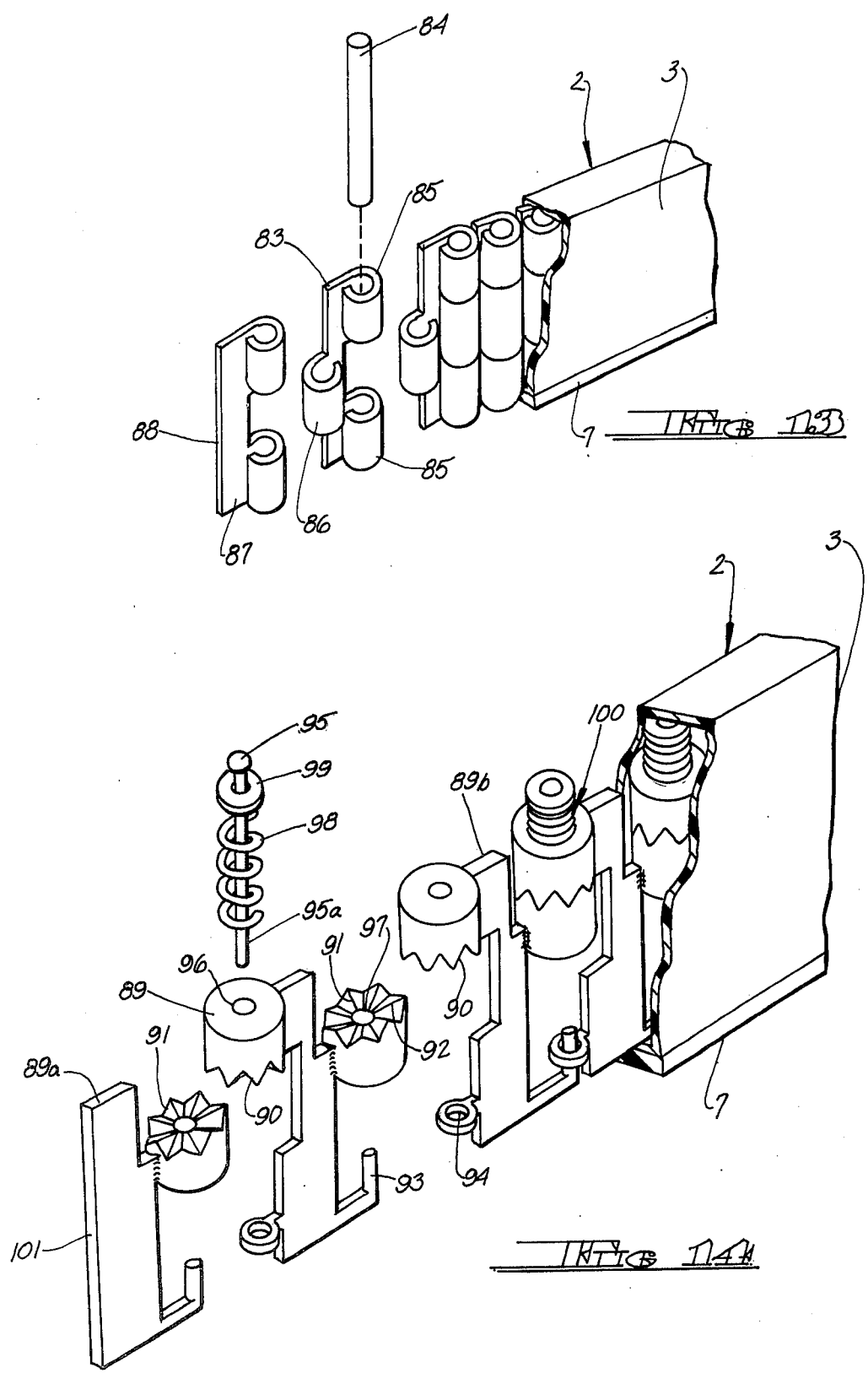

APPARATUS FOR SHAPING MOLDABLE MATERIALS

BACKGROUND OF THE INVENTION

1. Field of the Invention

The apparatus and method of the present invention relate generally to molds for shaping moldable materials and more particularly to a reusable mold with freestanding walls capable of being formed in any desired shape for use with edible andd nonedible materials and the like.

2. Description of the Prior Art

It is often desirable to provide a mold for shaping moldable materials in any desired shape. For example, such molds have proven useful in molding, baking or freezing edible materials such as cakes, gelatins, custards, ice creams, casseroles, ground meats, decorative ice shapes, butter or margarine, etc. Likewise, such molds have been used for nonedible materials such as ceramic, plaster, clay or plastic objects. Furthermore, the mold outline has found utility as a design pattern or design tracer for drawing, sewing, woodworking, or stenciling for spray painting, to name a few of the numerous examples.

U.S. Pat. No. 2,015,097 issued Sept. 24, 1935 to H.T. Bowman et al. describing A method and Apparatus For Shaping Edible Products, and U.S. Pat. No. 3,128,725 issued Apr. 14, 1964 to W. C. Becker et al. for Methods and Apparatus For Shaping Baking Materials and the Like, describe typical prior art attempts to develop a formable mold for the uses mentioned above. These molds are generally not reusable and are designed to be disposable, being constructed of paper, cardboard or similar nonpermanent material. Thus the molds tend to react unfavorably to the material to be molded, which generally is a liquid or moist material. The walls of the mold may become saturated and break down or warp, causing leakage of the moldable material through or under the mold. In addition, the mold walls may absorb the material or impart an undesirable taste or coloring to the material being molded. It has also been found that such molds may crimp when bent in particular design configurations, thereby limiting their usefulness as a universally shapable wall. It has further been found that difficulty may be experienced in separating the mold wall from the hardened material, resulting in destruction of the mold or the molded product, or both.

It has been proposed to use bars, flanges and other support features to hold the mold wall sections in a vertical position to retain the mold shape as well as prevent undesired expansion of the molded material, such as might occur during baking or freezing of an edible product. Such supports require a base or outer wall to provide structural integrity. Intricate designs are discouraged since an unwieldy number of support bars or flanges are required to adequately support the non-freestanding wall. In addition, such support means to nothing to prevent leakage beneath the mold wall. Thicker mold wall elements have not provided a satisfactory solution to the problem inasmuch as such walls do not permit the degree of flexibility necessary to construct intricate designs.

It has also been proposed to use tabs, with or without an adhesive, located on the bottom edge of the mold wall for stabilization and sealing. These tabs prevent intricate designs since the tabs tend to overlap and bunch when the wall section is bent. In addition, wall section bends may only be made between tabs, limiting the size and shape of the formed products. Slits located in a pan base for receiving the tabs have also proved ineffective. For example, approximately 200 randomly arranged slits would be necessary in a pan bottom to accommodate a mold capable of producing only ten designs and would be unnecessarily confusing to the user. In addition, slits aid in warpage of the pan bottom, allowing gaps between the pan and the wall sections permitting leakage of the moldable material. It has been found that, once a slit has been used and the tab removed, the slit becomes stretched or distended rendering the pan bottom unsuitable for reuse.

Prior art workers have also suggested design outlines preprinted on a pan bottom which the user may use as a guide to form the outline of the wall mold sections. It has been found, however, that such techniques using more than five designs, even if printed in different colors, prove confusing to the user and impossible to follow. Hence, the number of designs available from a particular mold in the past has been severely limited.

SUMMARY OF THE INVENTION

The present invention overcomes the foregoing disadvantages by providing a reusable mold for shaping moldable materials comprising a flexible freestanding wall capable of being formed in any desired shape to form the contour of the product to be molded. The mold walls are constructed of silicone rubber and aluminum, or similar materials, having the ability to withstand baking and freezing temperatures. When bent to a design configuration, the mold will hold its shape during the molding process, and may be easily returned to its original shape for reuse in other design configurations. The wall sections are freestanding and require no external support. The mold may include several interconnecting sections permitting simplified assembly of the mold and removal from the molded product. Holding means may also be provided to hold the mold walls tightly against a base section to prevent leakage of the moldable material. Designs may be made by molding the wall sections around geometric shapes, patterns, drawings, or in a freehand manner. Preprinted designs may be provided for shaping the mold to follow a particular design outline.

The flexible freestanding mold wall section consists generally of a thin solid or ribbed half-hard or thick dead-soft aluminum wall support strip which may be encapsulated with a resilient silicone rubber coating. Covering the aluminum with a resilient material prevents fatigue failure of the metal as well as adds stability and ease of shaping to the wall section. The lowermost portion of the wall section may be provided or trimmed with a sponge silicone rubber edge which forms a seal between the wall section and a suitable base upon which the section rests to prevent leakage of the material from within the mold. A resilient clip is affixed to one end of the wall section at its uppermost surface which engages a suitable tab located on the uppermost end of an adjoining wall section, thereby permitting several sections to be joined together, in overlapping relationship, to form the desired wall length for shaping the wall contour. Alternately, the wall may be constructed of frictionally hinged wall sections. In this configuration, the solid or ribbed wall support is replaced by a plurality of contiguous close ratio hinged joints, which permit the wall to be bent in the small increments necessary for intricate designs. Each individual hinge is constructed with a tightly fitting hinge post, creating a hinge capable of being moved to and retained in a desired bent position. In certain applications, the friction hinges may be replaced by pyramid type spring lock joints. In this configuration, each joint comprises a pair of convoluted meshed surfaces providing a discrete number of locked angular positions for the joint. The meshed surfaces may be urged together by springs or the like.

The mold contour may be formed freehand or by following a suitable design outline. In one embodiment, wall sections are interconnected and shaped by hand to follow the design outline. The completed mold then may be placed on a suitable base, such as an aluminum sheet pan, and filled with the material to be molded. Since the wall sections are temperature resistant, the mold may be used for baking or freezing.

In another embodiment, the design outline sheet is placed upon a suitable base, such as an aluminum sheet pan, and covered with a transparent heat resistant overlay, such as a heat resistant plastic. The wall sections are then interconnected and shaped to follow the design outline contour. The material to be molded may then be poured directly into the mold, the heat resistant transparent overlay forming a leakproof seal with the sponge silicone rubber edge of the wall section. In still another embodiment, the formed wall sections are placed atop an aluminum base having a plurality of parallel slots formed therein. An aluminum foil sheet is interspersed between joined wall sections and the base to form an impervious layer. A number of spaced spring loaded clips engage the upper edge of the joined wall sections, with the lower end of each clip piercing the aluminum foil sheet and engaging one of the parallel slots. The clip is locked into place thereby firmly holding the joined wall sections against the aluminum foil sheet and base to prevent leakage of the mold material beneath the wall of the mold.

In another embodiment, the joined wall sections surmount an impervious base, such as an aluminum sheet pan, and are pressed firmly against the base surface by a wire pressure grid or rack. The pressure grid may be comprised of a plurality of parallel spaced rod-like members attached at their ends of a rectangular frame. A member of spring-assisted pressure grid clips or other fasteners, such as connecting nuts and bolts, connect the frame and base together to provide a downward pressure, thereby sandwiching the joined wall sections between the pressure grid and the base to form a complete seal between the lower edge of the joined wall sections and the base.

In another embodiment, the lower edge of each wall section is slotted to approximately one-half the depth of the wall. When the wall sections have been joined together in the desired shape, the joined wall sections are positioned with the slit portion facing upwardly, and covered with a heat transparent plastic sheet. A blunt object is then used to force the plastic sheet into the slit in the wall edge. This procedure of tucking the plastic into the slit is followed around the wall edge, producing a sealed bottom for the mold. The entire mold is returned to the upright position and filled with the desired moldable material. After use, the heat resistant transparent plastic sheet may be easily removed from the slits, and stored with the disassembled wall sections for future use. A specialized plastic tool may be included to perform the tucking function, comprising a handle, a blunt rounded end, and a stop portion consisting of a cross arm attached perpendicularly to the handle to limit the distance the tool may be inserted into the wall slit. Alternatively, the wall may be constructed with a plurality of parallel resilient ribs spaced along the length of the outside surface of each wall section, each rib being hinged at its upper edge to snugly hold a tucked plastic sheet between the rib and the outer wall surface to form a leakproof base for the mold. Small tabs projecting from the outer surface of the wall between the wall and the resilient ribs may be provided to increase the frictional engagement with the tucked sheet. This construction has been found to be particularly useful for mold contours having sharply bent areas to insure effortless attachment of the tucked sheet.

In another embodiment, the lower outside surface of the wall sections may be provided with a plurality of parallel spaced silicon rubber ribs. The bottom of each rib is flush with the lowermost edge of the wall sections and contains a centrally located aperture for receiving a conventional round top tack. The joined wall sections configured in the desired shape are placed with the bottommost edge of the wall facing up, and a heat resistant plastic sheet placed over the joined wall sections. Round top tacks are then pushed through the heat resistant plastic sheet into the aperture located in the lowermost surface of each rib, thereby providing a leakproof bottom for the mold. The entire mold is then inverted and is ready for use.

In another embodiment, each wall section is substantially T-shaped in cross section, the wall having leg sections extending from the lower edge of the mold. The mold made up of such T-shaped wall sections is formed into the desired design shape and inverted, with the legs of the mold facing upwardly. A sheet of conventional aluminum foil is placed over the lower edge of the mold, with the edge of the foil extending beyond the edge of the mold. The foil sheet is then pressed into contact with the inner and outer legs of the wall section. The entire mold is inverted and the excess foil bunched around the outside of the mold section. Beginning at the center of the mold, the foil sheet is smoothed toward the inner surface of the wall sections, until the sheet is substantially smooth. Excess foil remaining on the inside of the mold may be bunched around the inner mold leg. The aluminum foil sheet bunched around the projecting legs of the wall sections thus forms a tight seal around the inner and outer edges of the base of the wall sections. After use, the wall sections may be disassembled and the aluminum foil sheet reused or discarded.

BRIEF DESCRIPTION OF THE DRAWINGS

FIG. 1A is a perspective view of a first embodiment of the mold of the present invention with one reusable freestanding wall section shaped to form part of the outline contour.

FIG. 1B is the mold of FIG. 1A with a second freestanding wall section added to follow the outline contour of part of the particular design pattern.

FIG. 1C is the completed mold of FIG. 1A with all freestanding wall sections joined to follow the outline contour of the particular design pattern.

FIG. 2 is a cutaway perspective view of a reusable freestanding wall section of the mold of the present invention.

FIG. 3 is a cutaway perspective view of a second embodiment of the present invention.

FIG. 4 is a perspective view of a wall-to-base attaching clip used with the embodiment of FIG. 3.

FIG. 5 is a perspective view of a third embodiment of the present invention.

FIG. 6 is a perspective view of a pressure grid clip used with the embodiment of FIG. 5.

FIG. 7 is a cutaway perspective view of a flexible rib freestanding wall section.

FIG. 8 is a fragmentary perspective view of an inverted single freestanding wall section used with a fourth embodiment of the mold of the present invention showing the heat resistant transparent plastic sheet tucked into the wall section slit.

FIG. 9 is a fragmentary perspective view of an inverted single wall section of a fifth embodiment of the mold of the present invention showing attachment of the heat resistant plastic sheet to the wall section ribs.

FIG. 10 is a perspective view of a sixth embodiment of the mold of the present invention.

FIG. 11 is a fragmentary cross sectional view of the mold of FIG. 10 showing the crushed foil seals.

FIG. 12A is an inverted fragmentary cutaway perspective view of a hinged-rib freestanding wall section.

FIG. 12B is a cross sectional view through the wall section of FIG. 12A.

FIG. 13 is an exploded fragmentary perspective view of a frictionally hinged freestanding wall section.

FIG. 14 is an exploded fragmentary perspective view of a lock joint freestanding wall section.

DESCRIPTION OF THE PREFERRED EMBODIMENTS

The general configuration of a single formable wall section 1 is illustrated in FIG. 2. Each wall section 1 comprises a thin flexible strip-like aluminum wall support 2 encapsulated with a thin resilient coating 3, which completely covers wall support 2. Wall support 2 may consist of half-hard aluminum, 0.016 inches or less in thickness. Encapsulant 3 may be solid silicone rubber, or a similar resilient material While silicone rubber covered aluminum is the preferred construction, other types of covered wall supports, such as aluminum covered with Teflon or coated canvas, will also serve. It has been found that covering the metal wall support with a material on both sides, of approximately the same thickness as the metal itself, prevents fatigue failure by limiting the degree to which the metal may be bent. In addition, the covering adds stability to the wall section. Alternatively, a thicker 0.048 inch or less dead-soft aluminum wall support 2 can be used in place of the half-hard aluminum support. In this configuration, encapsulant 3 may be omitted if desired.

A resilient clip 4 is secured to the wall support 2 at the upper end of the wall section by rivets 5 or similar fasteners. Clip 4 may be constructed of metal, plastic or similar spring-like material. Clip 4 may also be molded into resilient coating 3 or formed as an integral part of wall support 2. It is preferred that the clips be of a harder metal or temper than the wall support material in order to prevent breakage of the clip with repeated use. At the opposite end of the wall section 1 the wall support protrudes for a short distance and is bent at approximately a 45° angle to form a tab 6. As will be described, tab 6 operates in conjunction with clip 4 to join adjacent wall sections to form the complete mold.

A strip of sponge-like material 7, which may consist of a sponge silicone rubber, is secured to the lower edge of wall section 1 to aid in sealing the wall section to prevent leakage thereunder, as will be described hereinafter. A fill line 8 consisting of a ridge, groove or painted line, running the length of the wall sections, may also be provided to enable the user to fill the completed mold to the proper level with the material to be molded.

While shown formed in a U-shaped contour, it will be understood that the wall section 1 of FIG. 2 may be shaped or reshaped to any desired configuration, and will retain the desired configuration indefinitely.

FIG. 13 and FIG. 14 illustrate alternative constructions for wall support 2. In FIG. 13 wall support 2 comprises a plurality of closely spaced identical metal or plastic hinge joints, one of which is shown detached from an adjacent hinge joint at 83. Each hinge member 83 is secured to an adjacent hinge member by pin 84, whose diameter is slightly larger than the inner diameter of apertures 85 and 86 to provide a snug friction fit, thus enabling wall section 2 to retain a particular bent configuration. End hinge joint 87 lacks the central aperture 86 of hinge joints 83 to provide a smooth edge 88 for forming the end of wall section 2. It will be understood that the friction hinge embodiment of FIG. 13 may be provided with a suitable coating 3, on one or both sides of the wall, and sponge-like strip 7 as described hereinbefore in connection with the embodiment of FIG. 2. It has been found that the hinged construction of FIG. 13 finds particular utility in applications where sharp bends or intricate designs are required, or in environments where fatigue failure of a solid metal wall support may be a problem.

FIG. 14 illustrates a further alternative wall support 2 construction composed of a plurality of interlocking metal or plastic lock joints, one of which is shown detached from an adjacent lock joint at 89. Each joint 89 comprises a pair of convoluted surfaces 90 and 91 having a plurality of pyramid-shaped teeth, one of which is shown at 92, surface 90 meshing with surface 91 of adjacent joint 89a and surface 91 meshing with surface 90 of joint 89b. Adjacent lock joints are hinged by means of an upstanding pin 93 projecting from the bottom of each joint which engages a matching pin engaging aperture 94 projecting from the lower edge of an adjacent joint. Adjacent joints are connected together and the mating surfaces 90 and 91 thereof urged together by connecting post 95 which passes through centrally located apertures 96 and 97 in surfaces 90 and 91, respectively. Spring 98 and restraining washer 99 may be included on post 95 adjacent aperture 96 to urge surfaces 90 and 91 into meshed contact. End 95 of a post 95 may be flared (not shown) adjacent the lower portion of aperture 97 to maintain spring 98 in partial compression, as shown generally at 100.

In operation, teeth 92 of mating surface 91 engage the spaces between teeth 92 of mating surface 90, while teeth 92 of mating surface 90 engage the spaces between teeth 92 of mating surface 91. When wall 2 is bent to a desired design configuration surface 90 and 91 are rotated with respect to each other such that the pyramid-shaped teeth 92 of one ride along and over the teeth of the other. When wall 2 has been bent to the new position, teeth 92 of surface 91 will once again engage the spaces between teeth 92 of mating surface 90, and vice versa, to retain wall 2 in the new position. It will be understood that spring 98 is only partially compressed to allow for further compression as mating surface 90 is urged upwardly as teeth 92 of surface 90 travel over teeth 92 of surface 91. It will be further understood that the lock joint wall of FIG. 14 may be provided with a suitable coating 3, on one or both sides of the wall, and sponge-like strip 7 as described hereinbefore in connection with the embodiment of FIG. 2. End joint 89a may also be provided with a smooth edge 101 for forming the end of wall section 2.

FIG. 1A–FIG. 1C illustrate the sequence of events used to form a complete mold using a plurality of the formable wall sections 1 of FIG. 2.

A suitable design pattern 9 is placed atop a base 10. Base 10 may be a conventional aluminum sheet pan formed of 1/32 inch aluminum sheet or similar material. Design pattern 9 comprises a sheet of 65 pound cover stock paper or similar flexible material bearing the preprinted outline 11 having the desired finished contour of the mold. While for purposes of an exemplary showing, the outline of a train has been selected, it will be understood that an outline having any shape may be used. For example, a design pattern may be selected corresponding to a particular holiday, such as a shamrock for St. Patrick's Day, A Christmas tree for Christmas, or a turkey for Thanksgiving Day. In addition, standard shaped outlines such as squares, rectangles, circles, hearts, numerals, letters, etc. may be employed. In addition, blank sheets may be provided so that additional designs may be drawn by the user. Several different designs may be provided on one side of the design pattern and distinguished by contrasting colors or designs may be provided on both sides of a design pattern sheet. The pattern sheet may also be constructed as a stencil, whereby the desired design outline may be transferred onto an underlying surface, such as base 10, by means of perforations in the pattern sheet following the design outline. A suitable marker, such as a pen or pencil, may be inserted through the perforations to transfer the design outline onto the underlying surface. In addition, the design patterns may be made disposable or reusable, depending upon the type of material employed, for example, paper, plastic, etc. Furthermore, decorating suggestions, (not shown) such as life-size representations of a finished decorated product, may be provided within the design outline for the convenience of the user. Suggested recipes or instructions for using the design pattern may also be printed on the design pattern, in any convenient location, such as the area depicted 12 in FIG. 1A. While it is preferred that individual design pattern sheets be used, it is also within the scope of the present invention to provide a plurality of sheets bound together to form a booklet as shown in FIG. 1A, from which the user may select as desired.

While the mold of the present invention may be constructed directly atop a suitable design pattern 9, an additional intermediate layer (not shown), such as a heat resistant transparent sheet or other transparent film, may be provided between the mold and the design pattern to prevent leakage or sticking of the mold material, depending upon the particular mold material employed. This intermediate sheet may be removed prior to subsequent processing steps, or left in place with the completed molded product.

Turning to FIG. 1A, a single wall section 1a is placed atop the desired design pattern 9, with the sponge rubber edge 7 of the wall section resting against the upper surface of the design pattern 9, and bent to follow the outline contour of the particular design. For example, wall section 1a has been bent at locations 13–17 to follow the outline of the train design 11 of FIG. 1A. In addition, portion 18 of wall section 1a has been shaped in a circular contour to follow the outline of the wheel portion 19 of train design 11.

In FIG. 1B a second wall section 1b has been added atop design pattern 9 and shaped to follow the continuing contour of the train design. The upper edge of the end of wall section 1b containing tab 6 is inserted beneath tab 4 of wall section 1a with tab 6 facing outwardly. Wall sections 1a and 1b are then adjusted so that their lower edges make intimate contact with the upper surface of design pattern 9 and so that the end of wall section 1b containing tab 6 protrudes slightly beyond clip 4 of wall section 1a. Wall sections 1a and 1b are thus joined in overlapping relationship, with resilient clip 4 holding both sections firmly in place. Tab 6 of wall section 1b prevents wall section 1b from becoming disengaged from clip 4 of wall section 1a.

In FIG. 1C the mold is completed by shaping two additional wall sections 1c and 1d to follow the outline contour of design pattern 9. It will be understood that wall section 1c is joined to wall section 1b, wall section 1c is joined to wall section 1d, and wall section 1d is joined to wall section 1a in a manner similar to that described hereinbefore for the joinder between wall sections 1a and 1b. Since designs may be of various sizes, it may be found that the entire length of a particular wall section 2 is not needed to complete the mold contour. When this situation is found to occur, the adjoining wall sections are overlapped with the unneeded portion of the wall section left exposed on the outer surface of the completed mold outline. In particular instances, it may be necessary to bend the unneeded portion away from the outside surface of the mold to prevent interference with adjacent portions of the mold. If desired, designs can be provided that require a given number of complete wall sections, resulting in no overlap of the final wall section used.

The completed mold outline shown generally at 20 in FIG. 1C may be left atop design pattern 9, or removed to another suitable base section, such as an aluminum sheet pan. The inside surface of the mold may then be coated with a suitable lubricant, if necessary, and the mold slowly filled with the desired material to be molded 21 to the mold fill line 8, or as required. When the molded material has hardened to the desired consistency, the individual wall sections may be stripped from the molded product by disengaging the clip 4 between two adjacent sections, and slowly peeling the joined sections in one continuous strip from the contour of the molded product. Thereafter, the molded product may be removed from the design pattern 9 and used as required. The joined wall sections may be disconnected by slipping the tab end of each wall section from its associated clip 4. The individual wall sections may then be cleaned, straightened, and reused in other configurations.

While for purposes of an exemplary showing the individual wall sections have been described as being joined by a resilient clip 4, it will be understood that any other suitable fastening means may be employed, such as snaps, resilient fasteners, slots and tabs, etc. In addition, while the mold outline has been described for use in shaping moldable products, it will be understood that the outline may also be used as a stencil for spray painting, as a pattern or tracer for drawing, sewing, woodwork, or the like.

In certain situations, moldable materials of high viscosity may show a tendency to leak beneath the lower surface of the completed mold. Hence, it has been found desirable to include means for producing a downward pressure on the upper surface of the mold wall sections to insure a complete seal between the sponge rubber lower edge of the wall sections and the upper surface of the base upon which the mold rests.

In FIG. 3, a plurality of spring loaded clips 22, one of which is shown in more detail in FIG. 4, urge joined wall sections 1a-1d downwardly to produce a leakproof seal between the lower edge of the wall sections and the upper surface of the supporting base. When the completed mold outline 20 of FIG. 1C has been shaped to the desired contour, it is placed atop slotted aluminum base 23 which is surmounted by an impervious sheet 24, shown partially cutaway in FIG. 3. Slotted base 23 comprises a thin sheet of aluminum or other suitable material containing a plurality of parallel spaced slots, one of which is shown in FIG. 3 at 25. For example, base 23 may comprise a conventional aluminum sheet pan with 1/16 inch wide slots spaced ½ inch apart. In addition, to improve the rigidity of base 23, some of slots 25 may extend the entire length of base 23, such as slot 26, for example, while other slots, such as that shown at 27, may extend less than the entire length of base 23.

As is best shown in FIG. 4, attaching clip 22 comprises a clamp portion 28, a post 29, and a compression spring 30. Clamp 28 includes a pair of horizontal, parallel spaced webs 31 and 32, each web containing a centrally located aperture 33 and 34 respectively. Webs 31 and 32 are joined by a vertical member 35. Clamp 22 also includes a downwardly depending lip 36 parallel to and spaced from connecting member 35. Downwardly depending lip 36 is spaced a distance from connecting member 35 slightly greater than the thickness of a formable wall section 1. Post 29 comprises an L-shaped rod-like pin extending through apertures 33 and 34, with the leg portion 37 of post 29 underlying lower web 32. The uppermost end of post 29 is flattened, as at 40, to provide a surface which may be easily grasped by the fingers. A compression spring 30 is wrapped about the shank of post 29 between webs 31 and 32. The lowermost portion of spring 30 is enlarged slightly to prevent its passage through aperture 34, so that the spring rests upon the upper surface of web 32. The uppermost end of spring 30 is restrained by a pair of flanges 41 extending outwardly from the shank of post 29. Hence, when the flattened portion 40 of post 29 is depressed, leg 39 will be separated from the lower surface of web 32 by a distance at least equal to the thickness of slotted aluminum base 23. When the pressure on post 29 is released, the post will be urged upwardly by compression spring 30, returning to its original position. It will be understood that post 40 may also be rotated to lock the post in place, as will be described hereinafter.

In operation, the mold wall sections 1 are joined and shaped into the desired contour as described heretofore in connection with FIG. 1A-FIG. 1C. A sheet of conventional aluminum foil 24 or other impervious material, is placed atop slotted aluminum base 23. The upper surface of sheet 24 may be smoothed across base 23 to expose the location of slots 25, which will be indicated by impressions in sheet 24. The mold outline is then placed atop sheet 24 so that its outline lies within the boundaries of sheet 24 and base 23. Clips 22 are attached to the mold such that the wall section lies between connecting member 35 and downwardly depending lip 36 of the claim portion 28 of clip 22. Each clip 22 is then lowered until it rests upon the upper edge of the mold sections 1. Clips 22 are oriented such that the post 29 lies on the outside surface of the wall sections 1. Each clip 22 is moved along the wall so that leg portion 39 of post 29 is lying approximately above a slot 25. It will be observed that it will not be necessary to move attaching clips 22 more than approximately ½ inch to locate a slot 25. Post 29 may be rotated by grasping flattened portion 40 and twisting, in order to align leg 39 with a slot 25. Post 29 is then depressed, piercing the surface of sheet 24, until the upper surface of leg portion 29 lies beneath the lower surface of aluminum base 23. Post 29 may then be rotated until leg portion 39 is approximately perpendicular to slot 25, thereby locking post 29 into place. Compression spring 30 urges post 29 upwardly holding leg portion 39 firmly against the lower surface of base 23. In addition, the spring tension urges wall sections 1 firmly downwardly against the upper surface of sheet 24, thereby providing a leakproof seal. It is found that a particular portion of the mold is not sealed adequately, additional clips 22 may be added, as required.

Then the mold has been filled with the material to be molded, and the molding process is complete, post 29 of each clip 22 may be rotated until leg portion 39 lies parallel with its associated slot 25, and post 29 will spring upwardly to disengage the clips from the wall sections. The wall sections may then be disconnected and reused as described hereintofore. The clips 22 can be taken off or left on the wall sections, as required.

FIG. 5 illustrates an alternative method for holding completed mold outline 20 against base 42 by means of a pressure grid, indicated generally at 43, to prevent leakage of the material to be molded beneath mold 20. Pressure grid 43 comprises a generally rectangular wire frame 44 having a number of wire cross members, such as those shown at 45 and 46, spanning the length of the frame 44. Pressure grid 43 is held firmly against the upper edge of mold 20 by a plurality of pressure grid clips 47, one of which is shown in more detail in FIG. 6, located approximately at the corners of frame 44, and attached at their lower edges to base 42 as will be described hereinafter.

As is best shown in FIG. 6, each pressure grid clip 47 comprises a stationary section 48 joined to a sliding section 49 by means of a spring 50. Stationary section 48 includes a lip 51, located at the upper edge of clip 47, which engages wire rack 43. Lip 51 may be adapted to wrap around the substantially tubular members of rack 43 in order to prevent clip 47 from becoming disengaged from rack 43. Stationary section 48 also contains a pair of ears or flanges 52 which form a channel to slidably receive sliding section 49. Sliding section 49 has at its lower end a semicircular lip 53 which engages a corresponding slot in base 42, as will be described hereinafter. Sliding section 49 is slidably received within the channel formed by flanges 52 of stationary section 48. Stationary section 48 and sliding section 49 are joined by a spring 50, one end of which is attached to stationary portion 48, and the other end of which is attached to sliding portion 49, as is best shown in FIG. 6, thereby urging sliding portion 49 toward stationary portion 48.

Base 42 contains at its outer periphery a number of slots 54, which engage lip 53 of clip 47 to hold pressure grid 43 in place atop mold 20. In use, the shaped mold 20 is placed atop base 42, and pressure grid 43 centered over the upper edges of the mold sections. The required number of clips 47, four of which are shown for purposes of an exemplary illustration in FIG. 5, are attached to frame 44 with spring 50 facing inwardly of the frame such that lip portion 51 firmly engages frame 44.

Each clip 47 is then slid along frame 44 until aligned with a suitable slot 54. Sliding portion 49 is then extended until the upper edge 55 of lip portion 53 lies below the lower surface of base 42. Lip 53 is then inserted into slot 54 to complete assembly of the mold. The spring-loaded action of each clip 47 will urge pressure grid 43 tightly against the upper edge of mold 20 thereby compressing the lower edge of the mold sections to provide a leakproof seal, as described heretofore for the embodiment of FIG. 3 and FIG. 4. The pressure grid 43 may be removed and the mold disassembled by reversing the steps described above.

For purposes of an exemplary showing, the embodiment of FIG. 5 has been described in conjuncton with a pressure grid 43. It will be understood by one skilled in the art that the grid 43 may be eliminated and other means used to insure a leakproof seal between the mold bottom and the base. For example, a plurality of magnets may be attached to mold 20 for applying a downward force against the mold upon a metallic base. Likewise, grid 43 may be replaced by a plurality of springs extending the length of base 42 and overlying mold 20, the springs being attached at their ends to slot 54 to also provide a downward force against the mold 20. Alternatively, clip 47 may be replaced by a threaded bolt (not shown) having a clip at its upper end for engaging the upper edge of wall section 2 with the lower end of the bolt extending through slot 25. A nut threadedly engaging the portion of the bolt extending beneath slot 25 may then be tightened against the lower surface of sheet 23 to provide a downward force against the mold to insure a leakproof seal. In all embodiments, an adhesive, such as Dow-Corning RTV732, which is USDA approved for edible products, may be used to seal the wall to the base or impervious sheet.

Experience has taught that certain moldable materials of low viscosity may require more positive sealing to prevent leaks beneath the lower edge of the mold walls. The embodiment of FIG. 7 and FIG. 8 illustrates apparatus for insuring a leakproof seal.

FIG. 7 is a cutaway perspective view of a flexible rib freestanding wall section, shown generally at 56, for use with a fourth embodiment of the present invention. Wall section 56 comprises a ribbed flexible wall support 57, covered with a resilient encapsulant 58 of a similar material to that described in connection with the embodiment of FIG. 2. Flexible wall support 57, which may be constructed of 0.016 inch or less half-hard aluminum, for example, consists of a thin strip-like central section 59 running the length of wall 58 at approximately its midpoint, and a plurality of parallel spaced ribs, one of which is shown at 60, transverse central strip 59, forming the ribbed structure shown in the cutaway portion of FIG. 7. Each vertical rib, one of which is shown at 60, terminates slightly below the upper and lower edges of wall section 56. The ribbed structure provides the necessary structural support for wall section 56 while permitting greater flexibility of the strip, and at the same time forming pockets for accepting a flexible sealing sheet as will be described hereinafter. It will be understood that while the wall section 56 of the embodiment of FIG. 7 has been described as containing a ribbed wall support 57, various other types of wall support structures may be substituted therefor. For example, wall support 57 may comprise a plurality of metal or plastic sections connected together with appropriate friction or spring lock hinges as described hereinbefore to give the wall section 56 the necessary flexible strength. In addition, the solid wall support described in connection with the embodiment of FIG. 2 may also be used.

Wall section 56 also contains a resilient clip 61 similar in construction and function to clip 4 described in connection with the embodiment of FIG. 2. Wall section 56 also contains a tab 62 projecting from the end of wall section 56 opposite clip 61 for joining adjacent wall sections to form the completed mold contour. As illustrated in FIG. 7, the inner surface of tab 62 is offset from the inner surface of wall section 56 by approximately the thickness of the wall section designated t to provide a smooth continuous inner surface of the mold when adjacent sections are joined together as will be described hereinafter.

Mold section 56 may also contain a molded fill line 63 similar to the fill line 8 of the embodiment of FIG. 2.

The lower edge of section 56 contains a centrally located slit 64 running the length of section 56 to a depth of approximately one-half the wall section height and a width sufficient to accept a thin heat resistant plastic sheet as will be described hereinafter.

The completed mold contour may be formed by joining together several individual wall sections 56. The required number of individual wall sections 56 are arranged with slot 61 at the top of each wall section 56 facing outwardly. The tab 62 of a wall section 56 is then inserted beneath slot 61 of an adjoining wall section and the contiguous wall sections pushed together until surface 65 abuts surface 66 of the adjoining section, thus forming a continuous mold wall with a smooth inner surface. The mold wall then may be formed into the desired shape as described hereinbefore.

When the desired wall contour has been formed into the desired shape, the entire mold wall is inverted so that the slitted end of the wall sections is facing upwardly. FIG. 8 depicts this orientation for one individual wall section 56 shown disconnected from adjoining wall sections for purposes of clarity. A heat resistant transparent plastic sheet mold bottom 67 is then laid over the inverted mold outline, with the outer edges of sheet 67 projecting several inches beyond the outer edge of the mold outline. Sheet 67 may be constructed from a disposable heat resistant plastic, or may comprise a permanent reusable sheet constructed for example, of thin elastic silicone reinforced with Teflon threads. It will be understood that sheet 67 possesses sufficient strength to resist tearing when tucked into the slitted edge 64 of each wall section 56, as will be described hereinafter.

A suitable insertion tool, such as that shown at 68 in FIG. 8, is used to tuck the heat resistant plastic sheet into slit 64 of mold section 56. Insertion tool 68 comprises a rod-like handle section 69, a stop 70, transverse handle 69, and a slot expanding portion 71, which may be spherical in shape to spread the lips of slit 64 thereby enabling a portion of sheet 67 to be tucked into the slit 64.

In operation, slot expanding portion 71 of insertion tool 68 is placed atop sheet 67 and in a position parallel to and overlying slit 64. Tool 68 is then pushed downwardly tucking plastic sheet 67 into slit 64. Stop 70 of tool 68 limits the insertion depth of sheet 67. Tool 68 is then moved upwardly out of contact with sheet 67. The removal of tool 68 permits the lips of slit 64 to return nearly to their unbiased position, thereby firmly holding the tucked portion of sheet 67 in place. This operation may be repeated at spaced intervals along the periphery of the mold wall to provide a leakproof seal between the heat resistant transparent plastic sheet mold bottom 67 and the lower edge of the mold. To complete the mold, the entire structure, including heat resistant plastic sheet mold bottom 67, is inverted and placed on a suitable flat surface. Thereafter, the mold may be filled with any suitable moldable material. Disassembly of the mold upon completion of the molding operation proceeds in a similar manner to that described hereintofore for other embodiments. It will be understood that during disassembly heat resistant transparent plastic sheet 67 is easily removed from slit 64 and may be reused or discarded, depending upon the type of sheet employed.

An alternative method for attaching the heat resistant transparent plastic sheet mold bottom to the lower edge of the wall sections to provide a leakproof seal is shown in FIG. 9. In this embodiment, the mold section, a portion of which is shown in the inverted position at 72, contains a plurality of parallel spaced resilient ribs, one of which is shown at 73, projecting outwardly from the outer surface of wall section 72. The bottom of each rib 74 is flush with the lowermost edge of wall section 72 and contains a centrally located aperture 75 for receiving a conventional round tob tack, such as that illustrated at 76. When the required number of wall sections have been joined and configured in the desired shape, in the manner similar to that described for the embodiment of FIG. 8, a heat resistant transparent plastic sheet mold bottom 67 is placed over the joined wall sections, with the outer edge of the sheet 67 projecting several inches beyond the outer wall surface of wall sections 72. Sheet 67 is then stretched to provide a smooth surface. Tacks 76 are inserted through sheet 67 into aperture 75 in rib 73 to hold the sheet firmly in place against the mold edge bottom and provide a leakproof seal. It will be understood that a sufficient number of ribs will be provided along the outside periphery of mold section 72 to hold sheet 67 firmly in place without interfering with the flexibility of mold section 72. The entire mold outline, including the heat resistant plastic sheet mold bottom 67 may then be inverted, and the mold filled to the desired level with the material to be molded. After use, the mold may be disassembled by removing the tacks 76 and sheet 67, and disassembling mold section 72 as described heretofore.

FIG. 10 and FIG. 11 describe another method for improving the sealing characteristics of the mold. In FIG. 11, each mold section, one of which is shown in cross section at 77, comprises a vertical wall portion 78, similar in construction to the wall section described in connection with the embodiment of FIG. 2 or FIG. 7 and a horizontal leg portion 79 projecting outwardly and inwardly from the lower edge of vertical wall section 78. The portions of leg 79 extending from vertical section 78 may be the same width, or may be of unequal widths; for example, portion 79a may be wider than portion 79b. The individual wall sections 77 may be joined as described heretofore for the embodiments of FIGS. 1A FIG. 1C or FIG. 7 with wider leg portion 79a facing outwardly of the joined wall sections.

After the mold has been shaped to the desired contour, it is inverted, and a sheet of conventional aluminum or other foil 80 placed over the lower edge of the mold, insuring that the edges of sheet 80 extend beyond the outside surface of wall sections 77. Aluminum sheet 80 may then be molded around legs 79a and 79b. The entire mold with sheet 80 attached is inverted again and any excess foil remaining at the outer leg 70a of wall section 77 bunched around the outer leg 79a as shown at 80 in FIG. 11.

Starting in the center of the mold, sheet 80 may be smoothed toward the inner surface of wall 77 to remove all wrinkles that may be present in the sheet. The excess foil produced by this smoothing operation is then bunched around inner plate 79b as shown at 82 in FIG. 11. Bunched foil 80 and 82 may then be pressed downwardly onto leg 79 to form a leakproof seal between wall 77 and base portion 81.

After use, the mold embodiment of FIG. 10–FIG. 11 may be disassembled as heretofore described, and the aluminum foil sheet may be discarded or retained for future use. It will be understood that while aluminum or other foil has been described as preferred for the seal of the embodiment of FIG. 10–FIG. 11, other types of easily molded material, such as clay, plastic, etc., may be formed around the inner and outer edges of leg portions 79a and 79b to form a leakproof seal. It will be further understood that it may not be necessary to rely only on a seal between the wall and base as described. For example, grease, flour paste, latex rubber, adhesives, and the like may be applied to the inner wall-to-base juncture and/or clip areas to aid in sealing the mold. Likewise, a thin plastic or rubber sheet with an adhesive backing, shaped to the contour of the mold, may also be pressed against the lower edge of the mold wall to act as a liner in sealing the mold.

Turning now to FIG. 12A and FIG. 12B, an alternative wall section construction, shown generally at 102, for insuring a leakproof seal, is illustrated. In this embodiment, wall 102 comprises a thin flexible strip-like wall support 103, similar in construction to the wall support 2 of the embodiment of FIG. 2. Wall support 103 has a plurality of outwardly projecting tabs, one of which is shown at 104, located near the lower edge of support 103. Tabs 104 may be formed by slitting the lower end of wall support 103 and bending upwardly the portion of the wall support located between the slits. Wall support 103 may be encapsulated with a suitable coating 106, similar to the encapsulating coating of FIG. 2. It will be understood that the thickness of coating 106 and the length of projecting tab 104 are such that tab 104 extends slightly beyond the outer surface of the coating 106.

Wall section 102 also contains a plurality of parallel resilient ribs, one of which is shown at 107 spaced along the length of the outside surface of wall section 102. Each rib 107 is attached at its upper end 108 to the upper outside surface of wall section 102, with the lower inside surface 109 of rib 107 in contact with projecting tab 104. The resilient nature of rib 107 causes it to be urged toward tab 104 for engaging a thin plastic sheet 110 inserted between surface 109 of rib 107, and projecting tab 104, as shown in FIG. 12B.

In operation, mold sections 102 are interconnected in a similar manner to that described heretofore in connection with the embodiment of FIG. 1A–1C, and the entire mold outline inverted, so that projecting tabs 104 face upwardly. A plastic sheet 110, similar in construction to sheet 67, is placed over the inverted mold contour, so that the edges of sheet 110 extend slightly beyond the outer edge of wall 102. A thin instrument, such as a knife blade or a coin, is used to tuck the free edge of sheet 110 into the opening formed between projecting tab 104 and the inner surface 109 of resilient rib 107. When the inserting instrument is removed from the opening between the tab 104 and rib 107, rib 107 will return to its normal unbiased position, thereby urging the edge of sheet 110 against tab 104 and securely retaining sheet 110 in place. This procedure may be repeated around the periphery of the completed contour at each rib location until all edges of sheet 110 have been tucked into place, thereby forming a leakproof seal between sheet 110 and the edge of wall sections 102. The completed mold contour with the sheet attached is then inverted to the upright position, and the mold filled with the desired material to be molded as described hereintofore. When the molding process has been completed, sheet 110 may easily be removed from the wall sections 102 by grasping sheet 110 and lifting upwardly to disengage the edges of the sheet from between projecting tabs 104 and resilient ribs 107. It has been found that this construction is particularly useful for mold contours having sharply bent areas or intricate designs to insure effortless attachment of the tucked sheet.

It will be understood that various changes in the details, materials, steps and arrangement of parts, which have been herein described and illustrated in order to explain the nature of the invention may be made by those skilled in the art within the principle and scope of the invention as expressed in the appended claims.

I claim:

1. A reusable mold for shaping moldable material comprising a flexible elongated freestanding wall including means allowing said wall to be bent along a line extending transversely of said wall at any point along its length to form an outline of any desired shape, said wall including a plurality of transversely extending resilient ribs provided at spaced locations along the length of said wall and means for hingedly attaching said ribs to said wall, said wall further including means to frictionally engage a thin flexible sheet between said rib and said wall.

2. The mold according to claim 1 wherein said wall comprises a plurality of adjoining wall sections, each of said wall sections having means for connecting one wall section to an adjacent wall section to form said wall.

3. The mold according to claim 2 wherein said connecting means comprises a resilient clip attached to one end of each of said wall sections and a tab projecting from the opposite end of each of said wall sections, said clip of one wall section adapted to resiliently engage the tab of an adjacent wall section.

4. The mold according to claim 1 including a flat sheet-like base, a pressure grid and a plurality of pressure grid clips, said base having a plurality of elongated slots spaced around the periphery thereof, said grid being configured to overlie said base and comprising a wire-like frame supporting at least one wire-like member intermediate the ends thereof, said clips comprising a frame engaging section configured to communicate with said frame, and a slot engaging section configured to communicate with said slots, whereby said wall may be interposed between said frame and said base, said clips acting to urge said frame toward said base.

5. The mold according to claim 1 wherein said resilient coating includes a sponge-like portion forming one edge of said wall section.

6. The mold according to claim 1 wherein said wall support comprises a continuous solid member.

7. The mold according to claim 1 wherein said wall support comprises a continuous central band and a plurality of parallel spaced ribs extending transverse said band and substantially the height of said wall section.

8. The mold according to claim 1 wherein said wall support comprises a plurality of hingedly connected sections.

9. The mold according to claim 1 including a plurality of tabs, each tab projecting outwardly adjacent a corresponding rib, said ribs being biased away from said wall by said tabs, said tabs and said ribs being configured to frictionally engage a thin flexible sheet therebetween.

10. The mold according to claim 9 including a thin flexible sheet constructed of a temperature resistant plastic material, the peripheral edge of said sheet being frictionally engaged between said tabs and said ribs, said sheet forming a substantially leakproof base for said mold.

11. The mold according to claim 1 wherein one edge of said wall contains a slit extending the length of said wall, said slit being configured to receive therein the peripheral edge of a thin flexible tucked sheet.

12. The mold according to claim 11 including a thin flexible sheet constructed of a temperature resistant plastic material, the peripheral edge of said sheet being frictionally engaged within said slit, said sheet forming a substantially leakproof base for said mold.

13. The mold according to claim 1 wherein said wall includes a plurality of parallel spaced ribs projecting outwardly from said wall, said ribs being configured to receive therein in one end a pointed fastener.

14. The mold according to claim 1 wherein said wall includes a portion leg at its lower edge, said leg portion being attached transversely and extending substantially the length of said wall.

15. The mold according to claim 1 wherein the inner surface of said wall includes a fill line thereon, said fill line being configured to indicate the proper amount of said moldable material to be used in said mold.

16. The mold according to claim 1 including a thin sheet containing at least one design outline printed thereon, said sheet being configured to underlie said wall, said design being configured to assist in forming said wall to said desired shape.

17. The mold according to claim 16 including a plurality of said sheets bound together to form a book of said sheets.

18. The mold according to claim 1 including a thin sheet containing a plurality of perforations, said perforations arranged in a design outline, said sheet being configured to overlie a surface for transferring said outline to the surface for shaping said wall to desired shape.

19. The mold according to claim 18 including a plurality of said sheets bound together to form a book of said sheets.

20. The mold according to claim 1 including a flat sheet-like base and a plurality of wall-to-base attaching clips, said base having a plurality of elongated slots, some at least of said slots extending substantially the width of said base, said clips having means for engaging said wall and said slots, whereby said wall may be urged toward said base by said clips.

21. The mold according to claim 20 including a thin impervious sheet configured to be interposed between said wall and said base to cooperate with said wall to prevent leakage of said moldable material thereunder, said sheet being capable of being pierced by said means for engaging said base.

* * * * *